Feb. 10, 1959 E. V. BERGSTROM ET AL 2,873,144
GAS-SOLIDS SEPARATION IN A PNEUMATIC LIFT
Filed Aug. 26, 1952 7 Sheets-Sheet 2
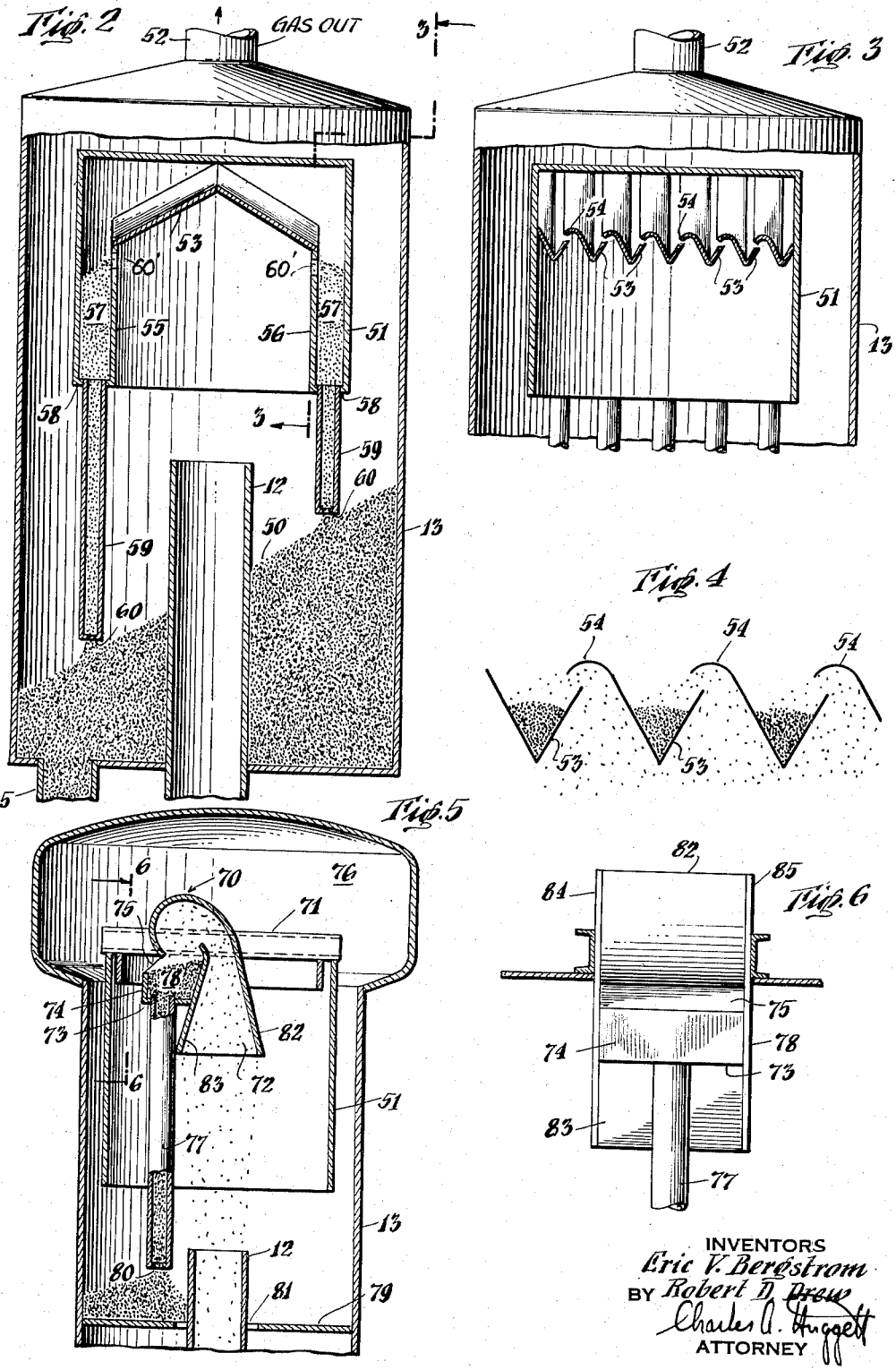
INVENTORS
Eric V. Bergstrom
Robert D. Drew
BY
Charles A. Huggett
ATTORNEY Feb. 10, 1959  E. V. BERGSTROM ET AL  2,873,144
GAS-SOLIDS SEPARATION IN A PNEUMATIC LIFT
Filed Aug. 26, 1952  7 Sheets-Sheet 3
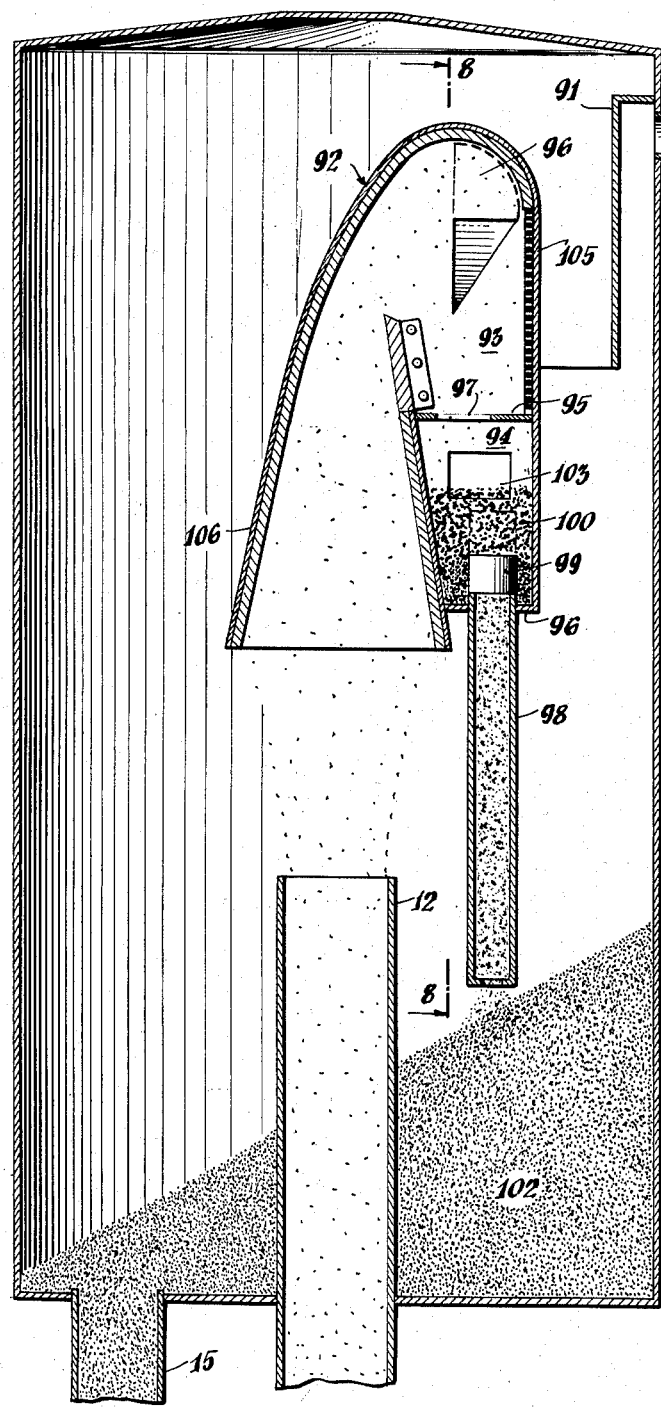
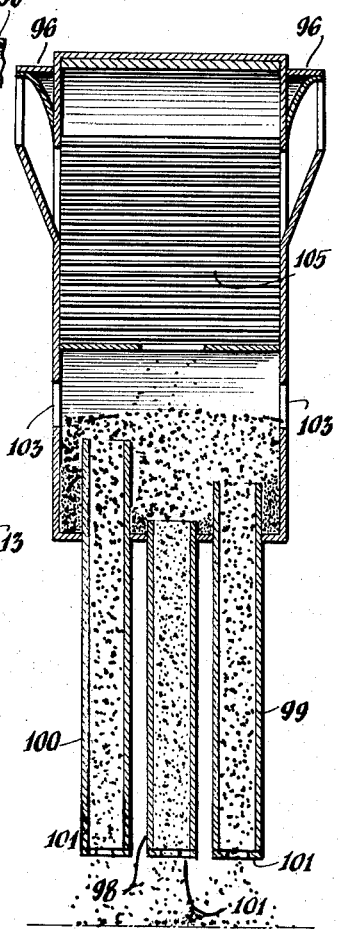
INVENTORS
Eric V. Bergstrom
Robert D. Drew
BY
Charles L. Tippett
ATTORNEY

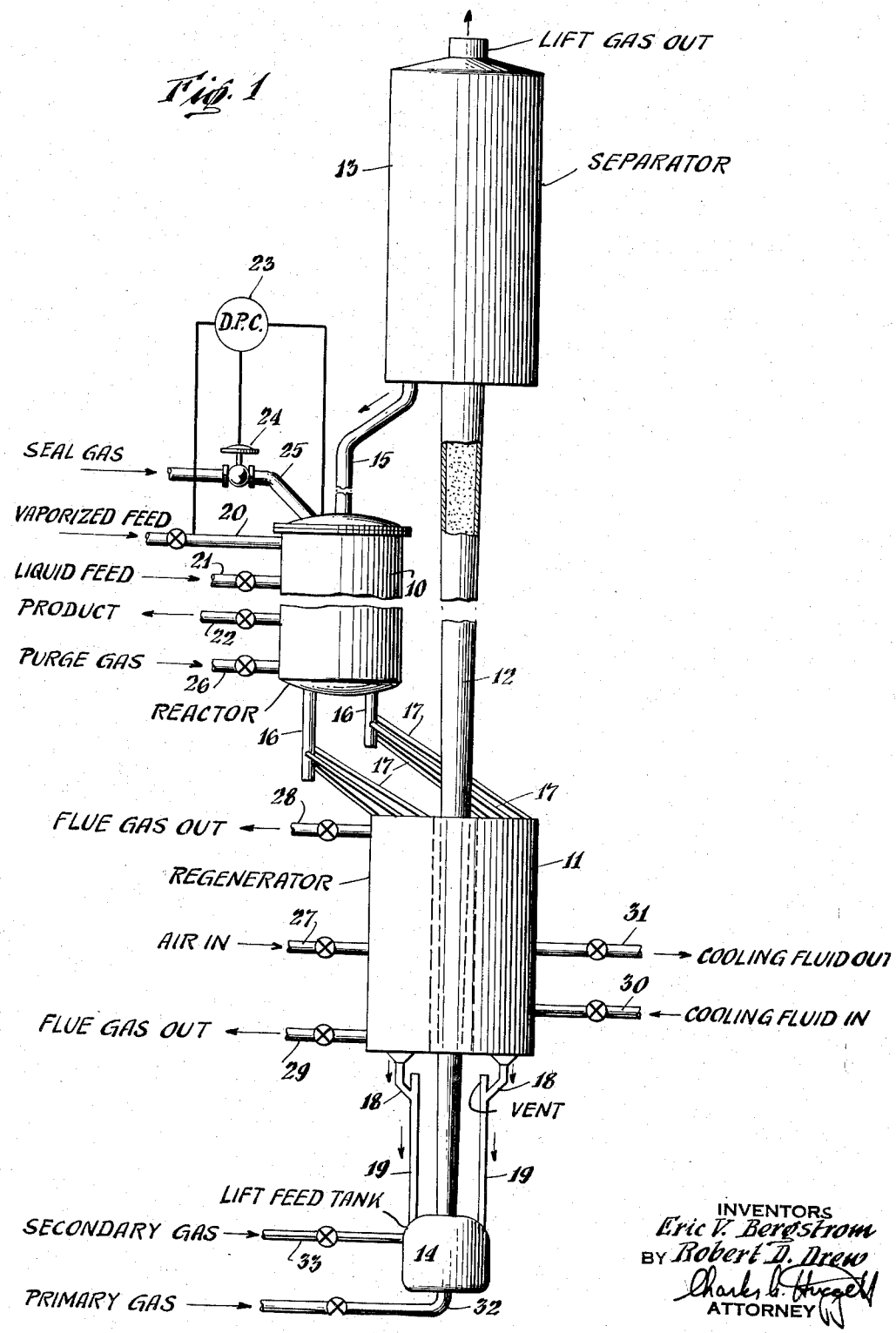

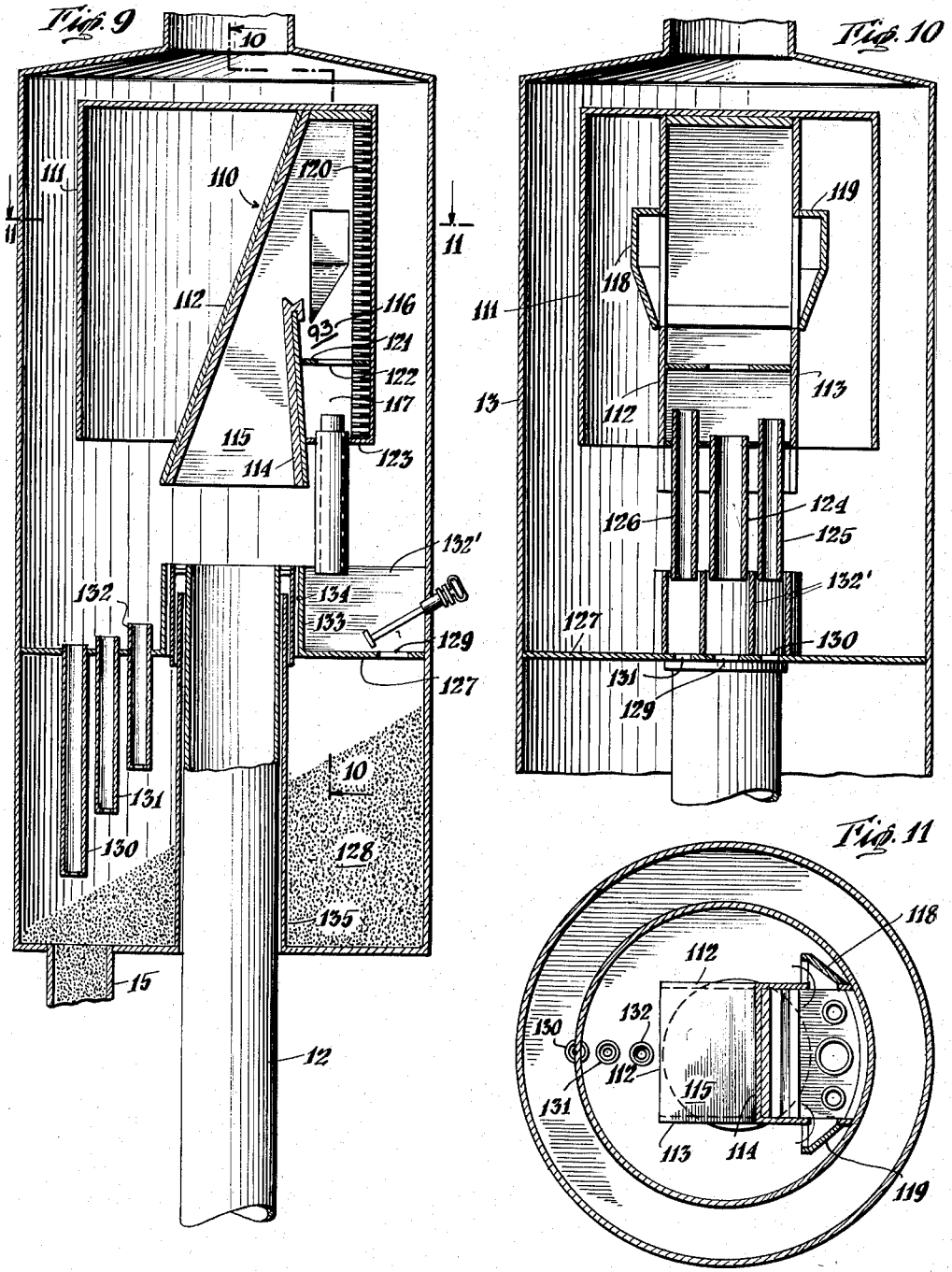

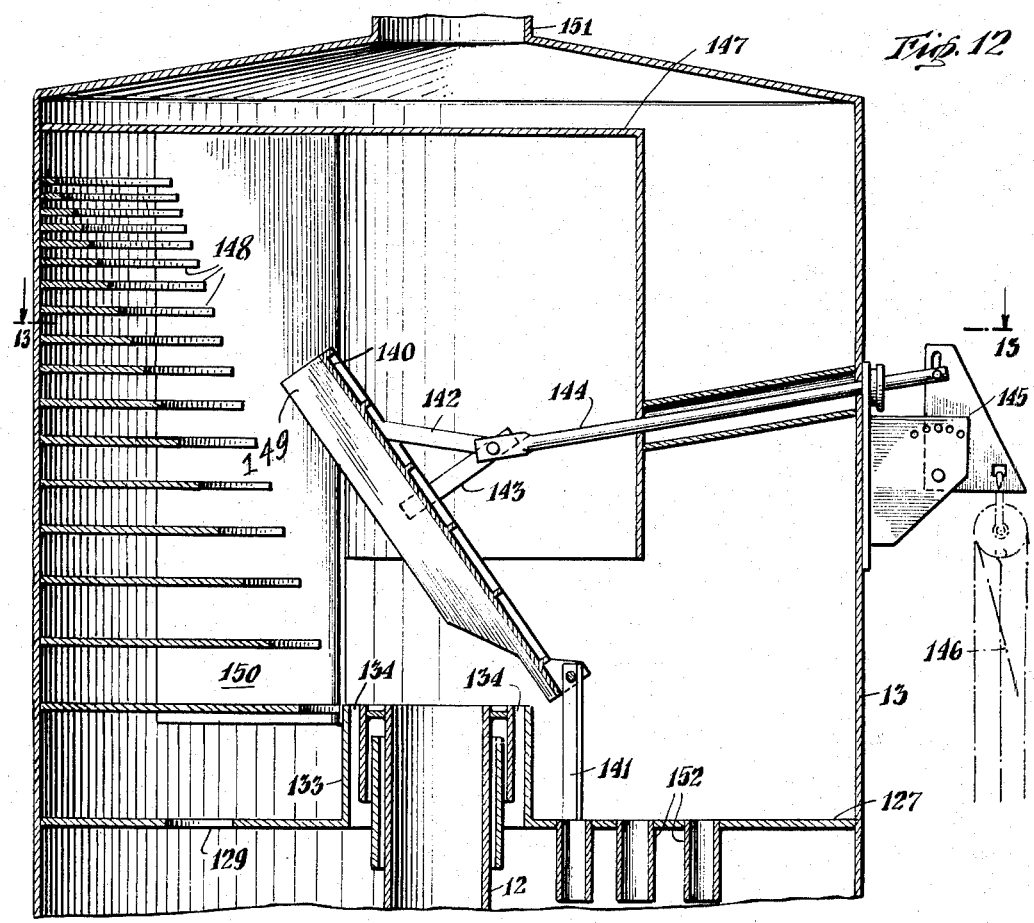
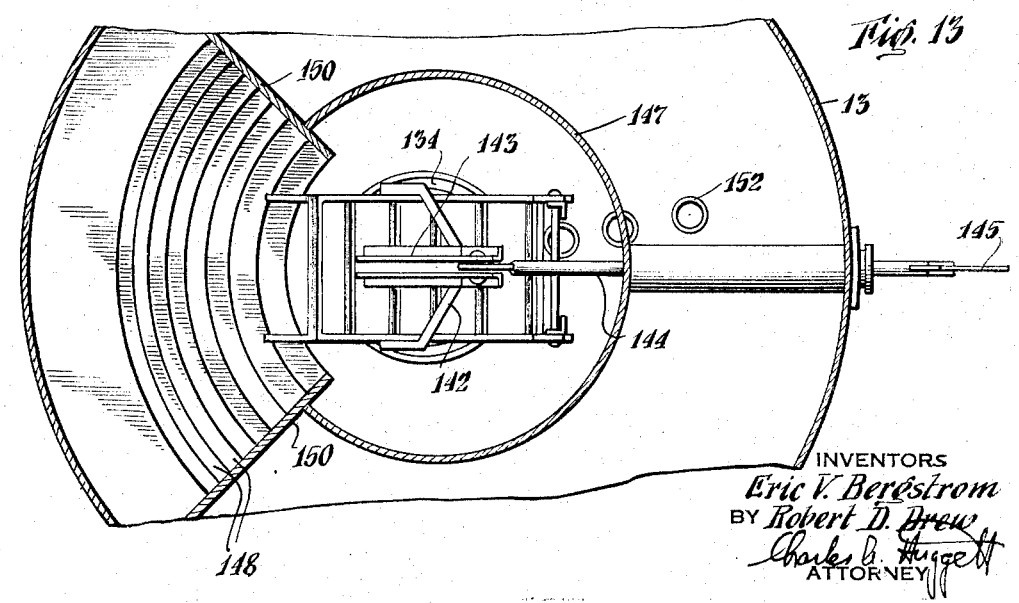

Feb. 10, 1959 E. V. BERGSTROM ET AL 2,873,144
GAS-SOLIDS SEPARATION IN A PNEUMATIC LIFT
Filed Aug. 26, 1952 7 Sheets-Sheet 6
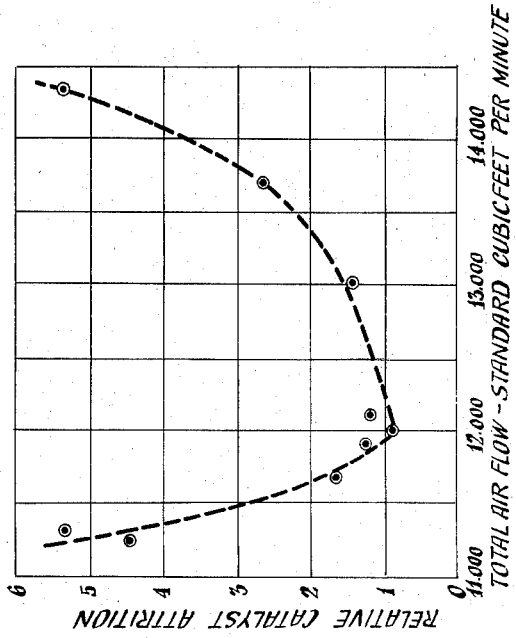
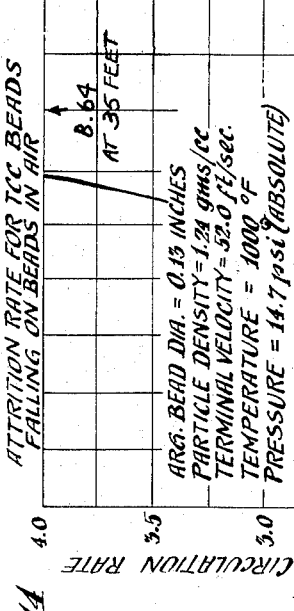
INVENTORS
*Eric V. Bergstrom*
BY *Robert D. Drew*
*Charles A. Huggett*
ATTORNEY

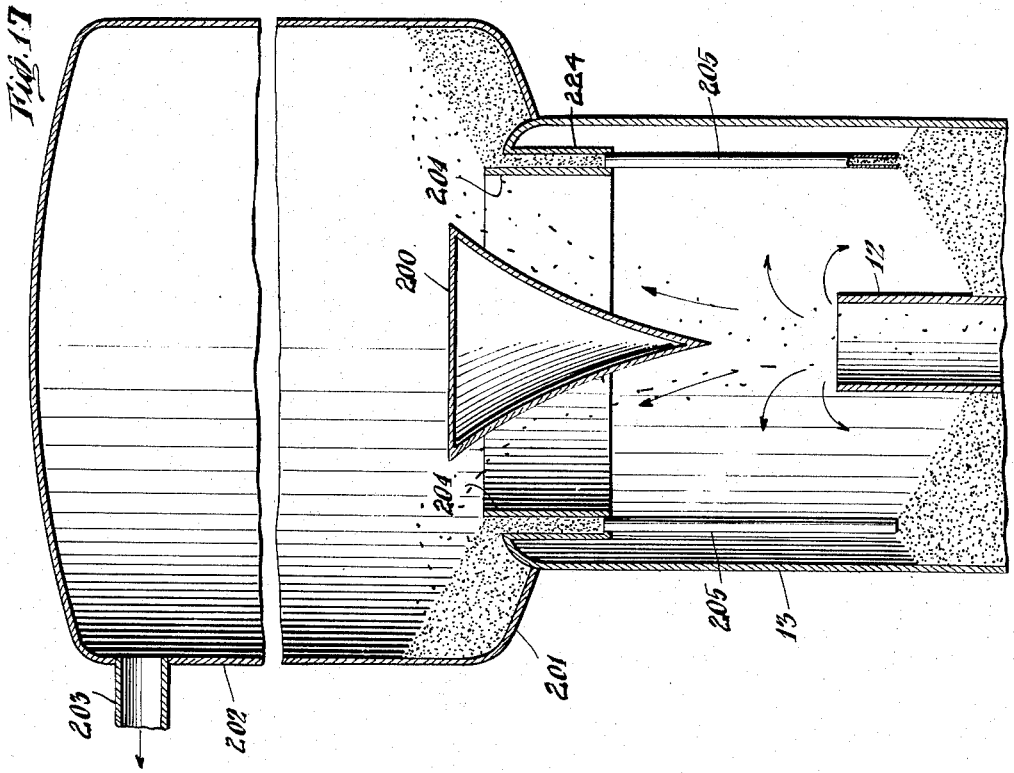
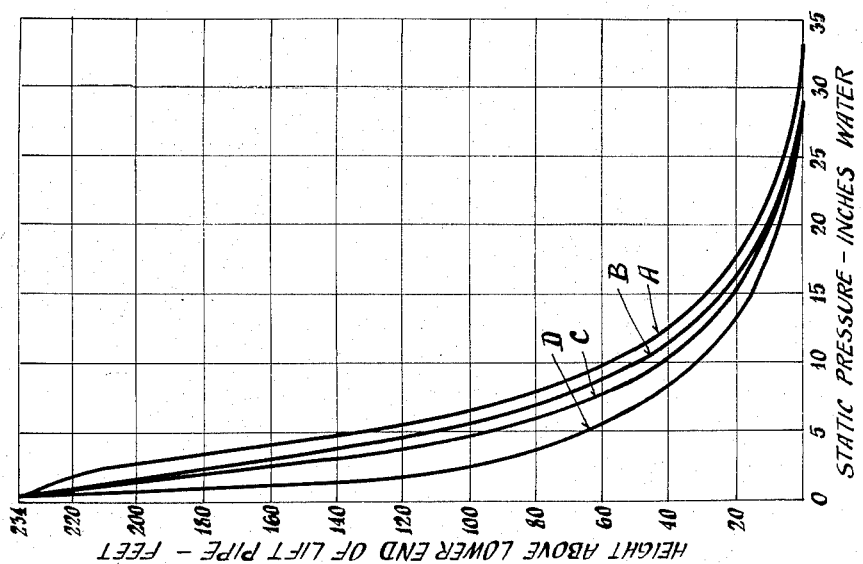

2,873,144

GAS-SOLIDS SEPARATION IN A PNEUMATIC LIFT

Eric V. Bergstrom, Short Hills, and Robert D. Drew, Wenonah, N. J., assignors to Socony Mobil Oil Company, Inc., a corporation of New York Application August 26, 1952, Serial No. 306,386

25 Claims. (Cl. 302—53)

This invention pertains to pneumatic lifts used to convey granular solid particles in a stream of lift gas from a location at one elevation to a location at a higher elevation. It is particularly concerned with pneumatic lifts used to raise granular contact material in continuous moving bed hydrocarbon conversion processes.

Various processes are known in the petroleum art which utilize a hot granular contact material as catalyst or heat-carrying medium to effect continuous conversion of hydrocarbons. The solid material is passed in the form of a compacted bed through reaction and reconditioning zones and lifted from the bottom of one bed to the top of the other to complete a continuous enclosed cyclic system. Typical processes are hydrogenation, desulfurization, coking, reforming and cracking. The reactant is passed through the voids in the bed of solids in the reaction zone and the reaction products are removed continuously from the other side of the bed. During conversion, a carbonaceous deposit usually forms on the surface of the contact material to a greater or lesser extent, depending upon the particular process. This carbonaceous deposit is removed by burning in the reconditioning zone.

The contact material may be natural or treated clays, such as bauxite, montmorillonite or kaolin or synthetics such as hydrogels of alumina, silica, chromia or combinations thereof. The granular material may be catalytic or absolutely or substantially inert. The inerts may be formed of corhart, mullite, coke or carborundum. Various size ranges have been found suitable for the different processes, which may vary broadly from about 3-100 mesh Tyler. For example, in catalytic cracking, the range of particle size may suitably be from about 4-10 mesh Tyler. It is preferred that the particles be of uniform shape, such as pellets, pills, capsules or spheres and of about the same size. This provides uniform voids in the bed, providing low pressure drop across the bed of solids with the gas being distributed uniformly through the bed. It is desirable, for this and other reasons, therefore, to avoid excessive breakage of the particles during transit through the system. The broken particles, called fines, generally interfere with the conversion operation, causing excessive channelling and excessive pressure drops across the beds. Since the fines must be removed and replaced by fresh catalyst, excessive breakage makes the process materially more expensive and involved.

Recent moving bed conversion processes utilize dilute phase pneumatic lifts to effect continuous elevation of the contact catalyst. The particles are blown through an upwardly-directed lift pipe in a stream of rapidly-moving lift gas from a level beneath one of the contacting zones to a level above the other contacting zones. The particles are conveyed upwardly through the lift pipe as a suspension in a stream of rapidly-moving lift gas. The gas in dilute phase lifts is separated from the particles in a separating zone at the top of the lift passage, and the separated particles are gravitated downwardly from the separating zone as a compact column into the contacting zone. A high level of particle breakage has been found to occur in the separation step. The particles issue from the top of the lift pipe in the form of a fountain. In order to insure that all the particles clear the top of the lift pipe, the particles are discharged from the top at a fairly substantial upward velocity. They travel a substantial distance above the top of the pipe before being reduced to zero velocity and hence fall a substantial distance before reaching a bed surface maintained about the lift pipe in the lower portion of the separating vessel. The particles collide with the bed surface with considerable force, the force being sufficient to cause high partcile breakage. Also, many particles fall back into the lift pipe where they collide with other particles issuing from the pipe with a force sufficient to cause high particle breakage. Also, many It is an object of this invention to provide an apparatus and method of lifting a granular contact material through an upwardly-directed lift passage in a stream of lift gas and separating the gas and solids in a separating zone at the top of the lift passage with minimum attrition.

It is a further object of this invention to provide an apparatus and method of separating a granular contact material out of a stream of rising lift gas and lowering the separated material onto a gravitating bed of the contact material with minimum fracture of the particles.

It is a further object of this invention to provide an improved apparatus and method of conveying a granular material pneumatically from one level to a higher level.

It is a further object of this invention to provide in a continuous moving bed hydrocarbon conversion system which incorporates a pneumatic transfer device for lifting the granular material from a feed tank to a separating vessel suspended in a stream of lift gas improved method and apparatus for separating the solids from the gas in the separating vessel with minimum attrition.

These and other objects will be disclosed in the following detailed description of the invention and the attached drawings showing the apparatus involved.

Figure 1 shows a complete moving bed conversion system which incorporates a pneumatic lift.

Figure 2 shows a vertical cross-section of the separating vessel located at the top of the lift pipe of Figure 1.

Figure 3 shows a vertical sectional view as seen on plane 3—3 of Figure 2.

Figure 4 is a diagrammatic showing of the solids collecting troughs illustrated in Figures 3 and 4.

Figure 5 shows a vertical sectional view of a separator which utilizes a different type of particle-catching apparatus from Figures 1-4.

Figure 6 shows a side view as seen on plane 6—6 of Figure 5.

Figure 7 shows a separator with alternate particle-catching apparatus.

Figure 8 shows a side view of the apparatus of Figure 7 as seen on plane 8—8 of Figure 7.

Figure 9 shows in vertical section a separator incorporating alternate apparatus for separating the particles from the gas and returning the particles to the compact column of solids.

Figure 10 is a side view of the apparatus of Figure 9 as seen on plane 10—10 of Figure 9.

Figure 11 is a horizontal sectional view of the separator of Figure 9 as seen on plane 11—11 of Figure 9.

Figure 12 shows in vertical section a separator incorporating apparatus means for adjustable control of the amount of particle deflection.

Figure 13 is a horizontal sectional view of the separator of Figure 12 as seen on plane 13—13 of Figure 12.

Figure 14 is a plot catalyst attrition v. height of fall for catalyst falling on steel plate and catalyst falling on catalyst.

Figure 15 is a plot of relative catalyst attrition v. total air flow for a moving bed hydrocarbon conversion system incorporating an air lift.

Figure 16 is a plot of height above the bottom of the lift pipe v. static pressure in the pipe.

Figure 17 is a vertical sectional view of a separator showing an alternate embodiment of the invention.

The invention in one of its broader aspects involves the lateral deflection of the particles issuing from the top of the lift passage to a bed or pile of the material maintained at a substantial elevation above the upper end of the passage with the subsequent downward transfer of the contact material from said pile of material in hindered flow to fall gently onto the surface of a bed of the material maintained at a level beneath the top of the passage. The major portion of the flow of solids is deflected out of the path of the solids issuing from the passage and caught at a level where the vertical component of particle velocity is substantially zero. The impact when the particles contact the surface of the pile of material is, therefore, slight and hence breakage is minimized. The particles are lowered preferably in substantially compact columnar form to a discharge level just above the surface of the bed of solids in the lower portion of the separator, whereby collision force and breakage is minimized at that point in the system.

The invention will now be disclosed as it applies to a catalytic cracking system, with reference first to the diagrammatic showing of the complete moving bed system shown on Figure 1. A superposed reactor 10 and kiln 11 is shown with a pneumatic lift pipe 12 located alongside these vessels. A separator 13 is located about the top of the pipe 12 and a lift feed tank 14 is located about the bottom of the pipe. A feed leg 15 is located between the separator and the reactor, conduits 16 and 17 are located between the reactor and kiln, and conduits 18, 19 are located between the kiln and lift feed tank. A continuous unobstructed path is formed thereby from the separator down through the reactor and kiln to the lift feed tank.

In operation, a bed level of contact material is maintained about the upper end of the lift pipe in the lower portion of the separator 13 and particles are continuously withdrawn from the bottom of the separator through the elongated feed leg 15 in substantially compact form. The gas pressure in the reactor 10 is usually advanced and hence the feed leg 15 is made long enough to insure that the particles feed smoothly into the reactor vessel against the advanced pressure. The pressure may be about 5–30 p. s. i. (gauge). The solid contact material is passed downwardly through the reaction vessel in the form of a compact bed and is continuously removed from the bottom of the vessel via the conduits 16, 16 in substantially compact columnar form. The vaporized feed is introduced into the vessel 10 through the conduit 20 and liquid feed may be charged via the conduit 21. The reactants pass downwardly through the voids in the bed and the converted products are withdrawn from the bottom of the bed via the conduit 22. A differential pressure controller 23 is used to control valve 24 in seal gas line 25, so as to prevent the reactants from rising up the feed leg. A small amount of seal gas passes upwardly through the seal leg 15 and thereby confines the reactants to the reaction zone. A suitable purge gas is introduced into the bottom of the vessel 10 via the conduit 26 to strip the catalyst of vaporizable hydrocarbons in the bottom of the reaction zone. The temperature in the reactor is usually about 800–1000° F., suitable reaction temperature.

The spent catalyst is introduced into the top of the kiln 11 via the multiplicity of conduits 17, which are uniformly distributed about the top of the regeneration vessel 11. The kiln 11 has an annular cross-section, the lift pipe 12 being projected through the central passage. The contact material is gravitated downwardly through the kiln in the form of an annular column of solids. Air is introduced into the kiln 11 at an intermediate level via the conduit 27 to travel both upwardly and downwardly through the bed. Carbonaceous contaminant on the surface of the catalyst is burned therefrom and the flue gas is removed from the top and bottom of the bed via the conduits 28, 29. The kiln is generally operated at or near atmospheric pressure, and at a temperature of about 1000–1300° F. Excessive temperatures may heat damage the catalyst and hence a cooling fluid is introduced into cooling coils in the kiln via the conduit 30 and withdrawn therefrom via the conduit 31.

The regenerated contact material is gravitated downwardly from the bottom of the kiln as a compact column through the conduits 18, 18 and 19, 19 into the top of the lift feed tank 14. The catalyst forms a compact bed of solids about the lower end of the lift pipe 12. A primary gas pipe 32 is projected upwardly into the bottom of the tank 14 and is terminated just below the lift pipe. The major portion of the lift gas is introduced into the lift pipe via this pipe without passing through the bed of solids in the tank 14. A minor portion of the lift gas is introduced into the lift tank 14 via the conduit 33 at locations laterally displaced from the lift pipe, so that this gas must pass through a substantial thickness of the bed of solids before it enters the lower end of the lift pipe. This minor portion of the gas, denominated secondary gas, pushes the contact material into the primary stream, and mingles with the primary gas to effect the upward transfer of the particles. It has been found that for best results the particles must be accelerated rapidly to a suitably high velocity in the lower portion of the lift and that the particle velocity must be reduced in the upper portion of the lift. The gas velocity in the lift is lowered by using a lift pipe having a gradually increasing cross-section from bottom to top. The lift pipe is tapered so that the particles are discharged from the top within the desired velocity range. It has also been discovered that in order to avoid surging in the upper portion of the lift and provide efficient discharge of the particles from the top of the lift, the average particle velocity as it issues from the top of the pipe should be broadly about 5–35 feet per second and preferably about 10–25 feet per second. The gas issuing from the top of the lift pipe expands in the separator because of the large cross-section of that vessel, thereby materially reducing the lifting force on the particles. However, the granular particles issuing from the top of the pipe possess appreciable momentum, and the particles are large enough and dense enough to resist following the laterally-moving gas. Therefore, the particles proceed directly upward in the separator for an appreciable distance until the upward velocity of the particles is reduced to zero. The particles fall thereafter in the form of a fountain about the upper end of the lift pipe. A bed level is maintained about the upper end of the pipe and the particles are collected on the surface of the bed. However, a substantial portion of the upwardly-moving particles fall directly down into the lift pipe and collide with the particles issuing therefrom. This collision causes high particle breakage. Excessive breakage occurs also when the particles hit the bed surface at high velocity. It is, therefore, desirable in these systems to avoid a free fall distance in excess of about 5 feet. Attrition may also be minimized by dropping the particles through several short drops instead of through an equivalent continuous total drop. The effect of height of free fall on attrition is shown on Figure 14. It is seen that the attrition for catalyst falling on catalyst is negligible below about 5 feet.

Referring now to Figures 2, 3 and 4, which show the interior of the separator 13, the invention will be more clearly disclosed. The lift pipe 12 is terminated at an intermediate level in the vessel 13 and the bed surface 50 is maintained somewhat below the upper end of the pipe 12 to provide space for surging and additional catalyst. A skirt baffle 51 is located above the lift pipe. The baffle has a diameter considerably larger than that of the lift pipe. An annular space is provided between the baffle 51 and the vessel walls for the upward flow of the lift gas. This gas is withdrawn from the vessel through the conduit 52 in the top of the vessel. The gas travels laterally after issuing from the top of the pipe but the particles proceed upwardly into the skirt section of the baffle 51. A multiplicity of V-shaped sloping troughs 53 are located in side-by-side relationship in the upper portion of the baffle 51. The troughs 53 have a downwardly-curved baffle 54 on one side thereof which projects over the adjacent trough. This baffle is formed by a downwardly-curving extension of one side of each trough. The particles passing upwardly between the troughs are confined to an area of continuously reducing cross-section, the sides of the troughs serving as baffles to direct the flow of the particles. The included angle at the bottom of the V-shaped troughs should be about 24–40 degrees and preferably about 30 degrees. The curved baffles 54 then direct the confined stream of particles laterally and the deflected particles fall into the troughs. The troughs are located far enough above the lift pipe 12 so that the upward velocity of the particles is very low at that level. The particles are, therefore, deflected readily without damage and drop gently into the troughs. The troughs are disposed lengthwise at an angle greater than the angle of repose of the contact material so that the particles roll down through the troughs. The troughs are arranged in two rows, the upper ends of each row meeting along a diameter of the roof of the skirt baffle and the lower ends sloping downwardly at an angle of about 30–40 degrees with the horizontal toward the skirt of the baffle. Vertical partitions 55, 56 are located on each end of the troughs 53 across the bottom section of the skirt baffle 51 to provide chambers 57, 57 into which the particles can drain. Floors 58, 58 are provided at the bottom of the chamber 57, 57 to maintain the contact material in the chambers in compact form. Two rows of drop pipes 59 depend from the chambers to a discharge level below the top of the lift pipe. Orifice plates 60 are located in the bottom of the drop pipes 59 to maintain the solids in the pipes in substantially compact form. The pipes 59 terminate at different levels because the solids are withdrawn from the vessel 13 through the pipe 15 which is located at one side of the bottom of the vessel. The bed surface therefore slopes downwardly to a location about the pipe 15 at about the angle of repose of the contact material. For granular catalyst this angle is about 30 degrees, although it may vary from about 25–45 degrees, depending upon the physical characteristics of the material. The pipes are terminated just above an imaginary plane surface disposed at about 30 degrees with the horizontal, the angle of repose of the catalyst, so that the particles dropped from the bottom of the pipes to the bed surface will fall substantially equal distances from each pipe. The orifice plates 60 are sized so that most of the catalyst flows through the orifices. Slots 60' are provided in the vertical partitions 55, 56 near the upper end thereof, so that the remainder of the catalyst will spill through these spillover slots. The spillover slots prevent catalyst from backing up into the troughs. For example, if 350 tons/hour of catalyst issues from the top of the lift pipe, the orifice plates may be sized to handle about 280 tons/hour total and the remaining 70 tons/hour will then flow through the spillover slots.

Figures 5 and 6 show an alternate embodiment of the invention. The particle deflector and catcher 70 is a single unit located in the upper portion of the vessel 13 on supports 71. The catcher 70 forms a passageway 72 which is substantially vertical at its lower end in alignment with the lift pipe. The upper end of the passageway 72 is curved laterally and terminated in a downward direction substantially completely out of the vertical projection of the lift pipe. The floor 73 and walls 74 form a box beneath the upper end of the passageway 72 to receive the catalyst. The walls 74 terminate below the upper end of the passageway 72, leaving a vent 75 for gas travelling through the passageway with the particles. Excess catalyst can also spill over the wall 74 rather than back through the passageway. The lower end of the passageway has sloping end walls, so that the cross-section of the passageway is gradually decreased from the bottom of the passageway up to the level at which the passageway is bent laterally away from the centerline of the lift pipe. The lower end of the passageway 72 is substantially above the upper end of the lift pipe, so that most of the gas escapes laterally into the region enclosed by the skirt baffle 51 and up through the annular passage between the baffle 51 and vertical walls of the vessel 13. A chamber 76 of enlarged cross-section is located at the top of the vessel 13 to receive the gas and allow entrained particles to settle therefrom and be returned to the system. Vertical drop pipe 77 depends from the box 78 to a level beneath the level of the upper end of the lift pipe 12. A horizontal partition 79 is located across the vessel 13 at a level beneath the bottom of the drop pipe. Orifice plate 80 is located in the bottom of the drop pipe 77, so as to maintain the solids in the pipe in substantially compact columnar form. The particles fall from the bottom of the pipe onto the surface of a bed of solids maintained on the partition plate 79. The plate 79 has an opening in its center which is large enough to provide a substantial annular passage 81 between the lift pipe 12 and the plate 79. Particles roll from the bed surface on the plate downwardly through the opening and fall onto the surface of a bed of solids maintained in the bottom of the vessel 13. This arrangement provides storage and surge capacity in the bottom of the vessel and yet prevents the particles from falling freely through any substantial distance.

A certain amount of lateral spreading of the stream of catalyst occurs between the top of the lift pipe and the bottom of the catalyst deflector and catcher. The lower section of the deflector passageway is, therefore, made larger in cross-section than the top of the lift pipe to collect as much of the catalyst stream as possible. The cross-section of the passageway is substantially smaller than the cross-section of the skirt baffle 51, however, so that a minimum amount of the lift gas will be caught by the passageway. The small amount of gas that does pass through the passageway 72 escapes through the vent 75 without interfering with the downward gravitation of the solids through the drop pipe 77. The passageway 72 may be of any cross-section; however, the apparatus shown on Figures 5 and 6 illustrates a rectangular cross-section formed by substantially vertical side walls 84, 85 and flat sloping end walls. The end walls are curved at their upper ends to provide the desired change in direction of the particles. The outer end wall 82 is curved through substantially a half circle, whereas the inner end wall 83 is curved through only a short sector of a circle. The outer end wall serves primarily as the deflecting baffle to deflect the particles out of the path of the vertical projection of the lift pipe.

The inner end wall is rolled over only a short amount to prevent particles from being caught on the curved section and returned downwardly through the passageway to the lift pipe.

An alternate arrangement of deflecting and catching apparatus is shown on Figures 7 and 8. In this embodiment the skirt baffle is eliminated and the gas is withdrawn from the side of the vessel 13 through the conduit 90. The entrance to the conduit 90 is shielded by a baffle 91 to prevent solids from exiting with the gas. The catalyst deflector and catcher 92 has an upper settling chamber 93 and a lower settling chamber 94 formed by the horizontal partition 95 and the floor 96. In the side walls of the catcher above the partition 95 are a pair of ears 96. The ears are protuberances on the side of the catcher providing shielded outlets in the catcher for the escape of the lift gas free of entrained catalyst. The gas is forced to make a complete reversal of direction of flow before being discharged through the ears back into the interior of the vessel 13. The particles fall downwardly onto the surface of a bed of solids maintained on the partition 95. The solids flow downwardly through the opening 97 in the partition 95 into the lower settling chamber 94 to form a bed of solids in the lower portion thereof. The three drop pipes 98, 99 and 100 depend downwardly from the bottom of the catcher and terminate in the lower portion of the vessel 13. The drop pipes terminate at different elevations in the chamber 94, so that as flow through the catcher decreases to the point where the solids in the pipes would no longer remain in compact condition, one of the pipes is automatically inactivated and the remaining pipes remain full of catalyst. The drop pipes 98, 99 and 100 have orifice plates 101 located in the lower ends, to keep the catalyst in the pipes in substantially compacted form. Apertures 103 are provided in the side walls of the catcher 92 communicating chamber 94 with the interior of the vessel 13 to provide a spillover outlet for excess catalyst. This provides an overflow for the chamber 94, thereby preventing solids from spilling back into the lift pipe 12. A subway grating 105 is provided on the inner surface of the outer end wall 106 within the upper settling chamber 93. The grating provides a multiplicity of small pockets each holding a small amount of catalyst. The deflected particles fall on the catalyst in the pockets and are, hence, caught on the surface of a catalyst bed. This prevents wear of the wall by the highly abrassive catalyst. The horizontal plates of the grating are spaced close enough together so that a line drawn from the inner edge of the plates at the angle of repose of the catalyst, about 30 degrees with the horizontal, intersects the wall of the vessel at or above the level of the next higher plate but not below that level. This keeps the wall shielded with catalyst.

Figures 9, 10 and 11 show an alternate apparatus arrangement for deflection, catching and easy letdown of the catalyst particles issuing from the top of the lift pipe 12. The particle catcher 110 is located in one side of the skirt baffle 111 with a sector of the skirt of the baffle serving as one wall of the particle catcher. A flat deflector plate 112, disposed at a steep angle with the horizontal, is attached to the top of the baffle 111 and projected downwardly to a level below the lower end of the baffle. The angle of this plate is such that the particles issuing from the top of the pipe are deflected out of the vertical projection of the pipe 12. This plate should be located at an angle of about 10–25 degrees with the vertical and preferably 15 degrees with the vertical. It should also be large enough to cover at least substantially all of the vertical projection of the lift pipe. The sidewalls 112, 113 of the catcher are substantially vertical and connect the side of the deflector plate 112 with the interior of the skirt of the baffle 111. A flat partition 114 is located laterally between the side walls 112, 113 at a steep angle with the horizontal to define one wall of the passageway 115 and also the upper settling chamber 116 and lower settling chamber 117. This partition may slope inwardly to provide a larger cross-section in the catching box 93. The partition is preferably terminated at a sharp edge at its upper end, with the upper edge sloping downwardly toward the chamber 93, so that particles directed toward the edge of the partition will fall into the chamber 93 rather than back into the passageway. The vertical partition 114 is terminated a substantial distance below the top of the skirt baffle 111 to provide an aperture through which the deflected particles can enter the upper settling chamber 116. The ears 118, 119 are located in the side walls of the catcher, similar to their location in Figures 7 and 8 and are used for the same purpose, the escape of gas from the catcher. A subway grating 120 is shown for a purpose similar to that described with reference to Figures 7 and 8. A horizontal partition 121 provides a floor for the upper settling chamber 116. The particles fall through the opening 122 into the lower settling chamber 117. A floor 123 is provided at the bottom of the skirt baffle 111 connecting between the skirt baffle and the inner partition 114. Drop pipes 124, 125 and 126 are provided, pipe 124 being terminated at the lowest elevation above the floor 123. Pipe 126 is terminated at the highest elevation above the floor 123 and pipe 125 is terminated at an intermediate level. The pipes 124, 125 and 126 are terminated at the same elevation at their lower ends. These pipes operate in a manner similar to the drop pipes shown on Figures 7 and 8, but feed onto the surface of a bed of catalyst maintained on the horizontal partition 127. Vertical separators 132 are located on each side of the drop pipes to provide a box for separately containing the solids delivered by each pipe. The drop pipes 124, 125 and 126 are located at the side of the vessel 13 diametrically opposite the withdrawal conduit 15 in the bottom thereof. The bed 128 of solids in the bottom of the vessel 13, therefore, slopes upwardly to a maximum elevation below the drop pipes. Orifices 129, 130 and 131 are provided in the partition 127 for the passage separately therethrough of the solids delivered to each box on the partition beneath the drop pipes 124, 125 and 126. The orifices are laterally displaced from the drop pipes so that an imaginary line drawn between the bottom of each pipe with the displaced orifice forms an angle with the horizontal greater than the angle of repose of the contact material, but less than the angle of internal flow. The angle of repose is that angle formed at the surface of a pile of granules, being generally for catalysts about 25–45 degrees. The angle of internal flow is that angle below which solids are not drawn from a location beneath a bed of solids. When solids are drawn from a location beneath a bed of the contact material, the particles are drawn primarily from the region directly above the withdrawal point. The surface of the bed of solids in the bottom of the vessel 13, although it varies in elevation, is never a substantial distance below the partition 127 in the region of the orifices 129, 130 and 131 and, therefore, the particles are not fractured in dropping the short distance from the openings to the bed surface. On the other side of the partition, however, the bed surface is a substantial distance below the partition 127. Pipes 130, 131 and 132 may be used, therefore, to lower the catalyst to the bed in a manner similar to that done by the pipes 124, 125 and 126. The lower ends of these pipes may be terminated just above the surface of the catalyst bed in the lower portion of the vessel or at staged levels so that the drop from the bottom of the pipes to the bed is never great. A collar 133 is located about the top of the lift pipe on the partition 127. An annular passageway 134 is provided between the collar 133 and the lift pipe 12 to provide an overflow space for catalyst in the event of any tendency for catalyst to flood back into the lift pipe. A sleeve 135 is projected upwardly from the bottom of the vessel about the lift pipe to a level near the top of the pipe. The sleeve acts as a guide for the lift pipe, but is not tightly connected to the pipe. The top of the lift pipe is rolled over the top of the sleeve to prevent particles from dropping down between the sleeve and the lift pipe.

Turning now to Figures 12 and 13, an alternate apparatus arrangement is shown. In this embodiment a deflector plate 140 is pivotally attached to a bracket 141 at a point near the top of the lift pipe, but laterally displaced therefrom. The deflector plate is held in position by the support rods 142, 143 and connecting rod 144. The connecting rod connects to a bell crank 145 which is operated by a pulley system 146 whereby the angle of deflection of the plate 140 can be adjusted to effect minimum attrition of the particulate material. The skirt baffle 147 is opened along its side adjacent the deflector plate and a multiplicity of horizontal trays 148 are arranged at spaced elevations opposite the slot formed thereby. The trays are attached to the inner wall of the vessel and extend into the vessel interior gradually increasing distances from top to bottom. Particles that are deflected onto the upper trays, therefore, cascade downwardly onto the lower trays and the distance of particle drops is rarely in excess of the distance between any tray and the next tray therebelow. The deflector plate 140 has side walls 149 on each side of the plate so that the particles are prevented from bounding off the plate in a lateral direction. Vertical end walls 150 are located on each side of the horizontal trays to confine the solids to downward flow over the trays. The roof of the skirt baffle 147 is extended over the top of the sidewalls 150 to prevent gas from flowing through the slot in the skirt of the baffle and directly upward about the top of the baffle to the gas outlet 151. The plate 127 is arranged similar that shown in the Figures 9, 10 and 11, and will not be disclosed further.

The bottom of the catcher must be located some distance above the top of the lift pipe to permit at least a substantial amount of the lift gas to escape laterally. The spacing is not critical as long as the lateral gas flow is not restricted. A spacing of about 2½–3 feet has been found satisfactory in a commercial lift 237 feet tall. The lift pipe was tapered outwardly from bottom to top and had an inside diameter at the bottom of 25.6 inches. The lift pipe handled a maximum of about 350 tons of grannular catalyst at an air flow rate of about 12,000 standard cubic feet per minute. This lift and its operation is disclosed in greater detail in co-pending application for United States Letters Patent Serial No. 210,942, filed February 14, 1951, now Patent No. 2,770,504 issued November 13, 1956. Using a catcher similar to that shown on Figures 9, 10 and 11 at the spacing of about 3 feet between the top of the lift pipe and the bottom of the catcher, approximately 90–95 percent of the contact material is found to pass through the catcher. Since attrition has been found to be proportional to the heights of fall, and more specifically a function of approximately the square of the heights of fall, the free fall distance must be limited below a safe level. For grannular cracking catalyst this may be about 5 feet. From laboratory tests of bead catalyst in free fall, it has been found that for a free fall distance of 5 feet, the attrition is about 1/10 ton per day for a 350 ton per hour circulation rate whereas for a free fall distance of 15 feet, the attrition is about 1½–2 tons per day for a 350 ton per hour circulation rate. The distance between the top of the catcher therefore and the horizontal partition or floor of the catching box should not be in excess of about 5 feet to limit the free fall drop below 5 feet. This effect is illustrated on Figure 14, the plot of attrition v. height of fall obtained from laboratory tests. It is seen preferably to catch the catalyst on a bed of catalyst rather than metal plate. For the same height of fall the attrition is always higher when the particles impinge on metal plate.

More air is required to reach the point of minimum attrition when using a bead catcher than is required to reach the point of minimum attrition without the catcher. The pressure of the gas in the pipe is measured at a pressure point near the top of the pipe and the air flow is adjusted to flow at a rate about 1 percent higher than the flow which causes fluctuation of the pressure of several times the average pressure. The use of pressure readings at an intermediate point in the lift pipe to control gas flow is disclosed in copending application for Letters Patent Serial No. 261,062, filed December 1951, now Patent No. 2,770,584 issued November 13, 1956. It is there shown that the gas flow through the lift is first reduced to that point where the pressure in the pipe increases to about twice the normal pressure. This is termed the point of incipient surge. Any further gas reduction will result in violent pressure fluctuations and actual surge in the pipe. Without the catcher installed on the commercial lift 237 feet tall, previously described, the minimum attrition was found to occur at an air flow rate about 50–200 cubic feet per minute above the incipient surge point. With a catcher installed, similar to the one shown on Figures 9, 10 and 11, although the attrition was lower for the same air flow rate, minimum attrition was found to occur at an air flow about 500–1000 cubic feet per minute above the surge point. For example, at optimum conditions without the catcher, the attrition was about 2¾–3¼ tons per day for a 350 ton/day circulation rate, whereas at optimum conditions with the catcher installed, the attrition was about 1.6 tons per day for a 350 ton/day circulation rate.

Although it is important that the catalyst be let down gently to the catalyst bed, it is also important that the catalyst be first deflected out of the stream of rising catalyst issuing from the lift pipe. If the catalyst is allowed to drop back into the lift pipe, excessive breakage may occur when the downwardly-moving catalyst collides with the rising catalyst. The skirt baffle is arranged to cause the air to move downwardly about the lower edge of the baffle and upwardly in the annular space between the baffle and the separator wall. The cross-section of the annular space between the baffle and the separator wall is adjusted so that the upward gas velocity is sufficiet to cause the fines to exit with the gas but is too low to cause the downwardly-moving granular particles to travel with the gas. This feature is disclosed in more detail in copending application for Letters Patent Serial No. 224,948, filed May 7, 1951, now Patent No. 2,717,811 issued Sept. 13, 1955. If the skirt baffle is not used, it may be desirable to pass the gas to an external separator, such as a mechanical cyclone separator, to effect removal of granular material for return to the system. However, when the skirt baffle is used currents of rapidly-moving gas develop under the baffle and the downwardly-moving particles may be caught in a stream of gas moving downwardly at high velocity, in which case the particles are rapidly accelerated and may strike particles issuing from the top of the lift pipe at a velocity of as much as 30 feet per second. Assuming the particles issuing from the pipe are travelling at a velocity of 20 feet per second, the total velocity differential would be 50 feet per second. Laboratory experiments indicate that when granular catalyst strikes a catalyst bed at a velocity of about 50 feet per second, approximately 50 percent of the catalyst is broken. It is, therefore, highly desirable that all the particles issuing from the lift pipe be first deflected from the upward projection of the lift pipe, then caught while moving at low velocity and finally lowered gently to the bed surface in the bottom of the separator. When the words "catcher" or "diverter" are used in this specification, it is intended that they be construed to cover a device for doing all three steps, for example, diverting the solids from the vertical projection of the lift pipe, catching the diverted particles when the upward velocity is low, and lowering the caught particles gently to the bed about the top of the lift pipe with a minimum of particle breakage.

*Example I*

Tests conducted over an extended period on a commercial T. C. C. unit which incorporated a 237 feet tall air lift and had an average catalyst circulation rate of about 350 tons/hour showed that without a catalyst catcher the attrition could not be reduced below about 3.1 tons per day. The air flow through the lift for minimum attrition was found to be about 150–200 cubic feet per minute above the air flow for incipient surging as measured at the 108 foot level in the lift pipe. When the catcher was installed, as shown on Figures 9, 10 and 11, the following results were obtained:

| Test | Average Air Rate in Excess of Incipient Surge, S. C. F. M. | Average Catalyst Consumption, Tons/Day | Average Catalyst Circulation, Tons/Hour | Basic Attrition Rate, Tons/Day/100 Tons/Hour Circulation |
| --- | --- | --- | --- | --- |
| A | 400 | 2.8 | 350 | 0.80 |
| B | 490 | 2.1 | 350 | 0.60 |
| C | 645 | 1.7 | 350 | 0.49 |
| D | 805 | 1.6 | 350 | 0.46 |

At the point where minimum attrition was found without the catcher, approximately 150–200 cubic feet per minute above incipient surge air flow, the attrition with the catcher installed was higher than that for run A above, but still below the attrition rate without the catcher.

*Example II*

Tests were made using a 200 feet tall lift pipe, tapered outwardly from bottom to top, and having an average internal diameter of about 16 inches. Steam was used as the lift gas in this experimental unit to raise siliceous synthetic bed catalyst of about 0.130 inch average diameter. The solids were gravitated as a compact column from the receiving vessel at the top of the lift pipe to the feed pot at the bottom of the lift pipe and the particle breakage measured continuously. The static pressure in the pipe was measured at a pressure tap in the upper portion of the pipe and at approximately 150 cubic feet per minute above the point of incipient surging, the following attrition results were obtained:

| Without the Catcher | With Catcher Installed |
| --- | --- |
| .20 ton/day at 100 tons/hour. | .13 ton/day at 100 tons/hour. |

Referring now to Figure 15, the relationship of attrition to air flow through the lift pipe is shown. This curve was prepared from operating data of a commercial moving bed hydrocarbon conversion system having incorporated in it the single air lift pipe for raising the catalyst. It is seen that these units are fairly sensitive to air flow, the best results being obtained for the commercial unit involved at an air flow of about 12,000 cubic feet per minute. Without the catcher installed, the best results are obtained at about 0.5–2.0 percent above the incipient refluxing rate and preferably about 0.75–1.25 percent above the point of incipient surge. At air flows higher than 12,000 cubic feet per minute, the pressure at the 180 feet level of the lift pipe is low and smooth. This may be indicated by curve D on Figure 16, a plot of static pressure at various levels along the pipe. As the air flow is reduced to about 12,000 cubic feet per minute, the static pressure slowly increases, as indicated by curves C and B on Figure 16. The pressure in the pipe increases and the fluctuation of the pressure increases with decreasing air flow. At an air flow which causes the pressure in the pipe to increase about 100 percent, minimum attrition is found to occur, this being the point of incipient surge. It is difficult to operate at that point because a slight decrease in air flow throws the operation into violent surge; with wild pressure fluctuations of several times the magnitude of the stable pressure and an increased pressure drop across the entire lift pipe. This is illustrated by curve A on Figure 16. Therefore, the lift must be operated at a safe margin above the point of incipient surge. Since the attrition rises at a fairly rapid rate when the air flow is raised above the point of incipient surge, the unit must be operated not substantially above the surge point for minimum attrition. When a catcher is installed on the unit, however, it has been discovered that the unit can be operated most efficiently at higher air flows. Broadly, the air flow may be about 2–20 percent higher than the air flow for incipient surging and preferably about 4–8 percent above the air flow for incipient surge. The catcher, therefore, provides improved flexibility and ease of operation.

Figure 17 shows an alternate embodiment of the invention. The diverter is in the form of an inverted cone 200 with the axis of the cone being aligned with the extension of the axis of the lift pipe. The catalyst issuing from the top of the pipe 12 is diverted laterally onto the shelf 201 formed by the bottom of the enlarged vessel 202. Gas discharge pipe 203 is located in the upper portion of the vessel 202. The cylindrical sleeve 204 forms an edge at its upper end to retain the solids on the shelf 201. The solids are gravitated from the shelf in substantially compact condition through the annular space between the sleeves 204 and 224, the drop pipes 205 to the bed of catalyst about the top of the lift pipe 12. It has been found that improved results are obtained when the surface of the cone diverter is slightly dished or concave. The angle at the apex of the cone should be about 20–40 degrees or preferably about 30 degrees.

It is to be understood that the specific examples of apparatus, design and arrangement, and of operation and application of this invention are intended only as illustrative of the invention and it is intended to cover all changes and modifications of the example herein chosen for purposes of disclosure, which do not constittute departure from the spirit and scope of the invention.

We claim:

1. In a process for converting hydrocarbons in the presence of a granular solid contact material in which the contact material is gravitated as a substantially compact mass through reaction and reconditioning zones and the gravitating mass of solids is contacted with hydrocarbons in the reaction zone and air in the reconditioning zone, the improved method of transferring the contact material from a first location beneath one of the zones to a second location above the other of said zones which comprises: suspending the granular material in a lift gas and transferring the suspended material upwardly through a confined lift passage from said first location to said second location, discharging the suspended material upwardly from the upper end of the lift passage into a receiving zone of substantially larger horizontal cross-sectional area than said lift passage, whereby the contact material upward velocity is rapidly decreased, deflecting the contact material issuing from said lift passage onto a supporting surface in said receiving zone, located substantially above the upper end of the lift passage and a substantial distance above a bed of the contact material about the lift passage, and flowing the contact material downwardly from said surface onto said bed of contact material while imposing a hindrance to the flow throughout a substantial portion of the vertical distance to the bed, whereby at least most of the granular material is delivered onto the bed with a force substantially less than if permitted to fall freely.

2. In a pneumatic lift the improved method of separating the suspended granular solids from the lift gas with minimum breakage of the particles which comprises: discharging the suspended solids upwardly from the top of the lift passage into a separating zone of enlarged horizontal cross-section, so that the gas expands laterally and the upward velocity of the solids is rapidly reduced, diverting at least a substantial portion of the particles issuing from the top of the lift passage laterally, interrupting the fall of the particles at at least one level above the upper end of the lift passage, so that the particles do not reach a downward velocity high enough to cause excessive breakage, and collecting the particles on the surface of a bed of solids maintained in the separating zone about the lift passage, whereby the breakage of particles is minimized.

3. In a pneumatic lift the improved method of separating the suspended granular solids from the lift gas with minimum breakage of the particles which comprises: discharging the suspended solids upwardly from the top of the lift passage into a separating zone of enlarger horizontal cross-section, so that the gas expands laterally and the upward velocity of the solids is rapidly reduced, diverting at least a substantial portion of the particles issuing from the top of the lift passage laterally out of the vertical projection of the passage, catching at least a substantial portion of the particles deflected laterally at a level a substantial distance above the top of the lift passage, impeding the downward movement of the particles, at least sufficient to prevent the particles from reaching a downward velocity high enough to cause fracture of the particles, gravitating the impeded particles downwardly toward a bed of the particles maintained about the lift passage in the separation zone and collecting the particles on the bed with a minimum amount of particle breakage.

4. An improved method of lifting granular solid material through an upwardly extending lift passage by a lift gas to an elevated receiving zone which method comprises: mixing granular material with a lift gas and transferring the material suspended in the lift gas through the lift passage, deflecting the contact material issuing from the upper end of the lift passage out of the path of vertical projection of the lift passage, catching the deflected granular material at an elevation a substantial distance above the upper end of said lift passage, and flowing the caught contact material downwardly onto a bed of the contact material maintained below the upper end of the lift passage while imposing a hindrance to the flow throughout a substantial portion of the vertical distance to the bed, whereby the granular material is delivered onto the bed with a force substantially less than if permitted to fall freely.

5. An improved method for lifting granular solid material through an upwardly extending lift passage by a lift gas to an elevated receiving zone which method comprises: mixing granular contact material with a lift gas and transferring the granular material suspended in the gas through the lift passage, deflecting the contact material issuing from the upper end of the passage onto a surface located substantially above the upper end of the lift passage and flowing the contact material downwardly onto a bed of the contact material maintained below the upper end of the lift passage while imposing a hindrance to the flow throughout a substantial portion of the vertical distance to the bed, whereby at least most of the granular material is delivered onto the bed with a force substantially less than if permitted to fall freely.

6. An improved method for separating a suspended granular contact material from a lift gas in a receiving zone located at the upper end of a substantially vertical lift passage which comprises: discharging the gas and contact material upwardly from the upper end of said lift passage into said receiving zone, the cross-section of the receiving zone being materially larger than the cross-section of the lift passage, so that the upward velocity of the particles is rapidly reduced to zero, deflecting the particles rising from the lift passage out of the path of vertical projection of the lift passage, catching the deflected particles on the surface of one or more piles of the contact material maintained in said receiving zone at at least one elevation above the upper end of the lift passage, the elevations being selected to catch the particles when the vertical component of velocity of the particles is substantially zero, withdrawing lift gas from the upper portion of the receiving zone substantially free of particles, gently lowering the particles from said piles of contact material to the surface of a bed of the contact material maintained in said receiving zone below the upper end of said lift passage, whereby particle breakage in said receiving zone is minimized, and withdrawing contact material downwardly from said bed, so that the bed level does not rise above the upper end of said lift passage.

7. An improved method for separating a suspended granular contact material from a lift gas in a receiving zone located at the upper end of a substantially vertical lift passage which comprises: discharging the gas and contact material upwardly from the upper end of said lift passage into said receiving zone, the cross-section of the receiving zone being materially larger than the cross-section of the lift passage, so that the upward velocity of the particles is rapidly reduced to zero, deflecting the particles rising from the lift passage out of the path of the vertical projection of the lift passage, catching the deflected particles on the surface of one or more piles of the contact material maintained in said receiving zone out of the vertical projection of said lift passage and at at least one elevation above the upper end of the lift passage, the elevation being such that the particles are caught when the vertical component of the particle velocity is substantially zero, withdrawing lift gas from the receiving zone substantially free of particles, gravitating the contact material downwardly from said piles in substantially compact columnar form to a discharge level just above a bed of the contact material maintained in said receiving zone below the top of said lift passage, discharging the contact material at said discharge level to fall freely onto the surface of said bed, and continuously withdrawing contact material from said bed to prevent the level of the bed from rising above the upper end of the lift passage, whereby the particles are separated from the lift gas with minimum attrition.

8. An improved method for separating a suspended granular contact material from a lift gas in a separating zone located at the upper end of a substantially vertical lift passage which comprises: discharging the gas and contact material upwardly from the upper end of said lift passage into said separating zone, the cross-section of the separating zone being materially larger than the cross-section of the lift passage, introducing the upwardly-moving contact material into a laterally-confined, upwardly-directed passage of substantially smaller cross-section than said separation zone, the passage being curved from bottom to top, discharging the particles from the upper end of the passage in a lateral direction into a substantially enclosed receiving zone, said receiving zone being located at least substantially out of the vertical projection of the lift passage, catching the laterally moving particles on a bed of the material maintained in said receiving zone, maintaining the surface of the bed of contact material in said receiving zone close to the upper end of said passage, so as to catch the laterally moving particles when the vertical component of velocity of the particles is substantially zero, gravitating contact material downwardly from said receiving zone through at least one laterally confined drain pasage to a discharge level below the upper end of said lift passage, discharging the catalyst from the bottom of said laterally confined drain passage onto the surface of a bed of the catalyst maintained in the lower portion of said separating zone, throttling the flow of catalyst at the bottom of said drain passage to maintain the catalyst in said passage in substantially compact condition throughout at least most of the vertical length of the passage, discharging lift gas from the upper portion of the separation zone and discharging catalyst from the lower portion of the separating zone.

9. An improved method for separating a suspended granular contact material from a lift gas in a separating zone located at the upper end of a substantially vertical lift passage which comprises: discharging the gas and contact material upwardly from the upper end of said lift passage into said separating zone, the cross-section of the separating zone being materially larger than the cross-section of the lift passage, collecting the upwardly moving contact material in a laterally-confined, upwardly-directed passage at an elevation above the upper end of the lift passage, the confining passage having a rectangular cross-section with one wall sloping from bottom to top so as to substantially cover the entire cross-section of the vertical projection of the lift passage and with the wall opposite the sloping wall being terminated at a lower elevation than the sloping wall, so that the contact material is deflected by the sloping wall over the short wall, catching the deflected contact material on the surface of a bed of the material maintained in a receiving zone which communicates with the upper end of said confining passage, the receiving zone being at least substantially out of the vertical projection of the lift passage, maintaining the level of the bed in the receiving zone high enough so that the contact material is caught on the bed surface at a very low vertical velocity, withdrawing gas from said receiving zone substantially free of contact material, gravitating contact material downwardly from the bottom of said receiving zone into a surge zone located a short distance below said receiving zone, at a flow rate which is high enough to prevent the bed level in the receiving zone from rising above that level at which it would cause the contact material to flood back into the confining passage, gravitating the contact material downwardly from said surge zone through at least one laterally-confined drain passage to a discharge level in the lower portion of the separation zone, throttling the flow of contact material in said laterally-confined drain passage, so as to maintain the contact material in substantially compact columnar form throughout at least most of the vertical length of said passage, discharging the contact material from the bottom of said passage onto the surface of a bed of the material maintained in said separation zone at a level not substantially lower than the bottom of the drain passage, withdrawing lift gas from the upper portion of the separation zone and withdrawing contact material from the bottom of the separation zone.

10. In a system in which a granular contact material is gravitated as a substantially compact mass through reaction and reconditioning vessels and contacted with hydrocarbons in the reaction vessel and air in the reconditioning vessel and in which the granular material is continuously withdrawn from the bottom of one contacting vessel and conveyed upwardly in a stream of lift gas through an upwardly-directed lift pipe to a location above the other contacting vessel, for subsequent gravitation therefrom into the top of the other contacting vessel, improved apparatus for separating the contact material from the lift gas comprising in combination; a receiving vessel located about the upper end of the lift pipe, means for deflecting the contact material issuing from said lift pipe, means for catching the deflected contact material, located in said receiving vessel at an elevation a substantial distance above the upper end of said lift pipe, and means for gently lowering the caught contact material downwardly onto the surface of a bed of the material maintained in said receiving vessel below the upper end of said lift pipe, whereby the breakage of the contact material in said vessel is minimized.

11. An improved apparatus for lifting a granular contact material with minimum particle breakage comprising in combination: an upwardly directed lift pipe, a separating vessel about the upper end of the lift pipe, with the upper end of said pipe being terminated intermediate the top and bottom of said separating vessel, means for deflecting the solid material issuing from the upper end of said lift pipe, means for catching said deflected solid material located a substantial distance above the upper end of said lift pipe, means for gently lowering the contact material downwardly from said catching means to a bed surface located about the upper end of said lift pipe with a force substantially less than free fall whereby particle breakage in the separating vessel is minimized.

12. Improved apparatus for separating granular contact material from lift gas issuing from the top of an upwardly directed lift pipe comprising in combination: a separating vessel positioned about the top of said lift pipe, means for deflecting the contact material rising from the lift pipe out of the projection of said pipe, means for catching the deflected particles located outside the projection of said lift pipe and at a substantial distance above the top of the pipe, means for gently lowering the contact material downwardly from said catching means to a bed surface located in said separating vessel at a level beneath the top of said lift pipe, with a force substantially less than free fall, whereby the particle breakage in the separating vessel is minimized.

13. Improved apparatus for separating granular contact material from lift gas issuing from the top of an upwardly directed lift pipe comprising in combination: a separating vessel positioned about the top of said lift pipe, means for deflecting the contact material rising from the lift pipe out of the projection of said pipe, means for catching the deflected particles, said means being located outside the projection of said lift pipe and at a substantial elevation above the top of said pipe, conduit means for withdrawing lift gas from the upper portion of said separating vessel, means for gently lowering the contact material downwardly from said catching means to a bed surface which is located in said separating vessel below the top of said lift pipe, with a force substantially less than free fall, and means for withdrawing contact material from said bed, so as to prevent the level of the bed from rising above the top of the lift pipe.

14. Improved apparatus for separating granular contact material from lift gas issuing from the top of an upwardly directed lift pipe comprising in combination: a separating vessel positioned about the top of said lift pipe, means for deflecting the contact material rising from the lift pipe out of the projection of said pipe, means for catching the deflected particles, said means being located outside the projection of said lift pipe and at a substantial elevation above the top of said pipe, conduit means for withdrawing particle-free lift gas from the upper portion of said separating vessels, conduit means depending from said catching means to a level in said separating vessel below the level of the upper end of said lift pipe, orifice means in said conduit means, for maintaining contact material gravitating through said conduit means in substantially compact columnar form, and a withdrawal conduit attached to the bottom of said separating vessel, for effecting the continuous withdrawal of contact material from said vessel.

15. A catalyst catcher for use in a separator of a pneumatic lift in which the lift pipe is terminated at its upper end at an intermediate level within said separator comprising in combination: a sloping deflecting plate mounted above said lift pipe, so as to cover at least most of the vertical projection of the pipe, upwardly directed side walls mounted transversely to said deflecting plate, an upwardly-directed partition plate mounted transversely between said side plates, so as to form a passageway with said deflecting plate and said side plates, the upwardly-directed partition being terminated at its upper end a substantial distance below the upper end of the deflecting plate, means defining a receiving chamber located adjacent to said upwardly-directed partition, so as to receive particles deflected by said deflecting plate over the top of said upwardly-directed partition, at least one downwardly-directed conduit depending from said chamber, for transferring contact material from said chamber downwardly to a bed of contact material maintained in the separator about the lift pipe, means defining a vent for the escape of gas from said receiving chamber, and throttling means located in the bottom of said downwardly-directed conduit, whereby the catalyst is gravitated downwardly throughout at least most of the distance from the receiving chamber to the surface of the bed of catalyst maintained about the lift pipe in the form of a substantially compact column of particles.

16. Claim 15 further characterized by the fact that the deflecting plate is mounted at an angle of about 10–25 degrees with the vertical.

17. Claim 15 further characterized by the fact that the deflecting plate is mounted at an angle of about 15 degrees with the vertical.

18. Claim 15 further characterized by the fact that the deflecting plate is mounted at an angle of about 15 degrees with the vertical and the upwardly-directed partition is substantially vertical.

19. An improved gas-solids separator for a pneumatic catalyst lift comprising in combination: a vertical vessel, a lift pipe projected upwardly into said vessel and terminated intermediate the top and bottom of said vessel, a skirt baffle, closed at the top and having a diameter less than that of the vessel, so as to provide an annular passageway between the baffle and the vessel wall for the upward transfer of lift gas, the bottom of the baffle being located close enough to the lift pipe so that substantially all the catalyst is projected upwardly into the region enclosed by the skirt baffle, means defining an outlet in the top of the vessel for the escape of lift gas, a sloping deflecting plate mounted within the baffle and covering at least substantially all of the vertical projection of the lift pipe, vertical side plates attached to the deflecting plate and mounted transverse thereto, the side plates being attached to said skirt baffle, a substantially vertical partition mounted transversely between the side plates, so as to form a passageway above the lift pipe, the partition being terminated a substantial distance below the top of the skirt baffle, a horizontal floor mounted between the partition and the skirt baffle, so as to provide a chamber for catching deflected catalyst, said chamber being at least partially out of the vertical projection of the lift pipe, means defining an opening in said floor, a pair of ears located on the side plates at an elevation above the floor, so as to provide shielded openings in the side wall for the escape of lift gas from said chamber, means associated with the opening in said floor defining at least one downwardly-projected passageway, and means in the bottom of said passageway for maintaining the catalyst in said passageway in compact form throughout at least most of the length of said passageway.

20. A catalyst catcher for use in a separator of a pneumatic lift in which an upwardly-directed open-ended lift pipe is terminated at its upper end at an intermediate level within said separator comprising in combination: a deflector plate located above said lift pipe at an acute angle with the horizontal, so as to deflect particles issuing from said lift pipe in a lateral direction, a pair of upwardly-directed side plates attached to the sides of said deflector plate, said side plates being transverse to said deflector plate, an upwardly-directed partition mounted transversely between said side plates, so as to form a passageway in conjunction with said side plates and said deflector plate which is substantially directly above said lift pipe, the partition being terminated at its upper end substantially below the top of the deflector plate, whereby particles deflected by the deflector plate travel laterally over the top of said partition, an upwardly-directed end plate mounted transversely between the side plates, a horizontal partition mounted transversely between the side plates and between the partition and end plate, so as to form a particle catching chamber below the level of the upper end of said partition, means defining a roof enclosing the top of said catcher, means defining at least one opening in the side plates at an elevation above said horizontal partition, for the escape of gas, means defining at least one opening in the horizontal partition, a floor located horizontally below said partition, connected between the side plates and between the partition and the end plate, forming a lower catalyst chamber beneath the horizontal partition, a multiplicity of substantially vertical pipes projected upwardly through said floor into said lower catalyst chamber, the pipes being terminated at their upper ends at spaced levels above the floor and at their lower ends at equal levels below the floor, orifice plates located horizontally in the bottom of each pipe, so that the granular material gravitated through said pipes is transferred largely in substantially compact condition and means defining an opening in the side wall of said lower chamber, arranged to prevent contact material from flooding back over the upwardly-directed partition.

21. An improved gas-solids separator for a pneumatic catalyst lift comprising in combination: a vertical vessel, a lift pipe projected upwardly into said vessel and terminated intermediate the top and bottom of the vessel, a skirt baffle, closed at the top and having a diameter less than that of the vessel, so as to provide an annular passageway between the baffle and the vessel wall for upward transfer of lift gas, the bottom of the baffle being located close enough to the lift pipe so that substantially all the catalyst is projected upwardly into the region enclosed by the baffle, means defining an outlet in the upper portion of the vessel for the escape of lift gas, a multiplicity of V-shaped troughs mounted in the upper interior of the skirt baffle in side-by-side relationship, deflecting members comprising extensions of one side of the V-shaped troughs, being bent to direct catalyst passing upwardly between the troughs into the troughs, the troughs being mounted at an angle greater than 30 degrees with the horizontal, so that granular material caught in the troughs drains downwardly to the lower end of said troughs, means defining at least one laterally confined passageway extending downwardly from the lower ends of said troughs to a discharge level in the lower portion of the separator, and means for throttling the flow of solids located in the lower portion of said passageway, whereby the catalyst is gravitated through said passageway in substantially compact columnar form to a discharge level below the top of the lift pipe.

22. An improved gas-solids separator for a pneumatic catalyst lift comprising in combination: a vertical vessel, a lift pipe projected upwardly into said vessel and terminated intermediate the top and bottom of the vessel, a skirt baffle, closed at the top and having a diameter less than that of the vessel, so as to provide an annular passageway between the baffle and the vessel wall for upward transfer of lift gas, the bottom of the baffle being located close enough to the lift pipe so that substantially all the catalyst is projected upwardly into the region enclosed by the baffle, means defining an outlet in the upper portion of the vessel for the escape of lift gas, a multiplicity of troughs, having a V-shaped cross-section, mounted in the upper interior of the skirt baffle, in side-by-side relationship, in the form of two rows, the troughs in each row being located at an angle greater than 30 degrees with the horizontal, the upper ends of the troughs being attached to the roof of the skirt baffle, two substantially vertical partitions located across the interior of said skirt baffle beneath the lower ends of said troughs, forming chambers for the collection of catalyst gravitated downwardly through the troughs, two substantially horizontal floor plates located across the bottom of said vertical partitions and skirt baffle, forming floors for the chambers, deflecting baffles formed by extension of one side of each trough, the baffles being curved downwardly, for directing particles passing upwardly between the troughs laterally into the interior of the troughs, a multiplicity of drain pipes depending from said floors arranged in two rows, for transferring catalyst downwardly from said chambers to a discharge level below the top of the lift pipe, orifice plates in the bottom of said drain pipes, sized to maintain the catalyst passing through said chambers and drain pipes in substantially compact columnar form, and means for withdrawing contact material from the lower portion of said separator.

23. An improved gas-solids separator for a pneumatic catalyst lift comprising in combination: a vertical vessel, a lift pipe projected upwardly into said vessel and terminated intermediate the top and bottom of said vessel, a skirt baffle, closed at the top and having a horizontal cross-section less than that of the vessel, so as to provide a passageway between the baffle skirt and the vessel wall for upward transfer of lift gas, the bottom of the baffle being located close enough to the lift pipe so that substantially all the catalyst is projected upwardly into the region enclosed by the skirt baffle, means defining an outlet in the top of the vessel for the escape of lift gas, a sloping deflecting plate mounted within the baffle and covering at least substantially all of the vertical projection of the lift pipe, substantially vertical side plates attached to the side of said deflecting plate and mounted transverse thereto, a substantially vertical partition mounted between said side plates, so as to form an enclosed upwardly-directed passageway above the lift pipe, the partition terminating at its upper end a substantial distance below the upper ends of the deflecting plate and the side plates, a roof horizontally mounted at the top of the side plates and the deflecting plate, means defining a substantially enclosed chamber associated with said partition external of said passageway and in communication with the upper end of said passageway for catching particles deflected by said deflecting plate over the top of said partition, a multiplicity of downwardly directed conduits projected at their upper ends into said particle-receiving chamber, the conduits being terminated at spaced vertical levels above said chamber, means defining collecting boxes about the bottom of each pipe, means defining an orifice in the bottom of each collecting box, laterally displaced from the vertical projection of the downwardly-directed conduit, whereby a portion of the catalyst is held up in each collecting box, probing rods projected laterally into the side of the separator, adapted for longitudinal movement in the region above each orifice in the collecting boxes, whereby the number of orifices flowing catalyst into the lower portion of the separator can be determined, and an outlet in the bottom of the separator for the withdrawal of catalyst.

24. In a processing system wherein free-flowing, relatively frangible, granular solids are in substantially continuous circulation, comprising movement of the solids downwardly in a continuous stream along a downflow pass, passage of the solids through a zone wherein they participate in the treatment of fluid substances, and elevation of the solids through a confined upflow pass by momentum imparted to them by a fluid flowing vertically through said upflow pass at a velocity great enough to raise the solids in a continous stream through the upflow pass, whereby the solids after leaving the upflow pass rise to a considerable height above the discharge end of the upflow pass, into an enclosed disengaging zone of greater horizontal cross-section than that of the confined upflow pass, until the momentum imparted to them is dissipated, and would then drop in uninterrupted free fall to a level below that of the discharge end of the upflow pass and thereby cause significant attrition damage to the solids by their impact, at the velocity developed by them over the extent of their drop, against the bottom of the disengaging zone or solids already on that bottom, the method of effectively reducing the maximum free fall velocity attainable by the descending granular solids by the end of their drop after disengagement from the lift fluid and thereby reducing the possibility of attrition damage by effectively reducing the force of their impact against the disengager bottom or other solids already on it, which method comprises applying against the rising solids, after they have left the confined upflow pass and at an elevation considerably below the uninterrupted attainable peak level that they otherwise would reach by the momentum imparted to them by the fluid stream, a force sufficient to divert them out of the projected vertical path that they would otherwise have followed due to the momentum imparted by the vertically flowing fluid stream, thereby starting the solids into free fall by gravity from a considerably lower elevation than that at which they would otherwise start such free fall; interrupting the fall of the descending disengaged solids at a finite number of spaced apart elevations, at least one of which is above the discharge end of the upflow pass, and allowing solids from each elevation above at least another one to fall in sequence to the lower ones, and to fall from the lowest such elevation to the disengager bottom or other solids already on it, and whereby solids falling from such interruption elevations avoid contact with solids in the space occupied by the stream discharging from the discharge end of the upflow pass.

25. In a solids circulating system comprising a gas lift conduit and a solids discharge chamber surrounding the upper portion of the lift conduit and into which chamber the conduit discharges a stream of gas and frangible solids for disengagement in said chamber, the improvement which comprises in combination within said chamber of means for directing a force against the stream of gas and solids discharging from the lift conduit to divert the solids out of the projected vertical path that they would otherwise follow due to the momentum imparted to them by the vertically flowing lift fluid stream; a series of vertically spaced apart trays positioned at least to that side of the lift conduit to which the issuing stream of gas and solids will be diverted and having their edges nearest the stream spaced outwardly from the space to be traversed by the rising stream, at least one of the trays being lcoated at a level above the top of the lift conduit and the nearest edge to the stream of each such tray being spaced further outwardly from the projection of the axis of the lift conduit than the corresponding edge of the tray immediately below it; whereby solids disengaged from the stream, after having reached their maximum height of rise on discharge from the lift conduit, are interrupted in their fall by the trays, and solids from upper trays fall in sequence to lower trays.

References Cited in the file of this patent

UNITED STATES PATENTS

| 1,597,438 | Ennis | Aug. 24, 1926 |
| 2,262,879 | Beckey | Nov. 18, 1941 |
| 2,587,669 | Weinrich | Mar. 4, 1952 |
| 2,616,521 | Berg | Nov. 4, 1952 |
| 2,628,188 | Kirkbridge | Feb. 10, 1953 |
| 2,646,316 | Kollgaard | July 21, 1953 |
| 2,669,540 | Weinrich | Feb. 16, 1954 |
| 2,674,498 | Thayer | Apr. 6, 1954 |
| 2,689,153 | McClure | Sept. 14, 1954 |

FOREIGN PATENTS

| 278,858 | Germany | July 18, 1913 |
| 313,613 | Germany | Aug. 24, 1916 |

UNITED STATES PATENT OFFICE

CERTIFICATE OF CORRECTION

Patent No. 2,873,144　　　　　　　　　　　　　　　　February 10, 1959

Eric V. Bergstrom et al.

It is hereby certified that error appears in the printed specification of the above numbered patent requiring correction and that the said Letters Patent should read as corrected below.

Column 2, line 13, for "partcile" read -- particle --; line 16, for "high" read -- excessive --; same line, strike out "Also, many"; column 10, line 46, for "sufficiet" read -- sufficient --; column 14, line 67, for "pasage" read -- passage --.

Signed and sealed this 2nd day of June 1959.

(SEAL)
Attest:

KARL H. AXLINE
Attesting Officer

ROBERT C. WATSON
Commissioner of Patents